No. 777,662. PATENTED DEC. 20, 1904.
R. F. CARR.
SYSTEM FOR COLLECTING RAILWAY FARES BY TICKET.
APPLICATION FILED APR. 5, 1904.
NO MODEL.

INVENTOR.
Robert F. Carr

No. 777,662.

Patented December 20, 1904.

UNITED STATES PATENT OFFICE.

ROBERT F. CARR, OF AVONDALE, ALABAMA.

SYSTEM FOR COLLECTING RAILWAY FARES BY TICKET.

SPECIFICATION forming part of Letters Patent No. 777,662, dated December 20, 1904.

Application filed April 5, 1904. Serial No. 201,768.

*To all whom it may concern:*

Be it known that I, ROBERT F. CARR, a citizen of the United States, residing at Avondale, in the county of Jefferson and State of Alabama, have invented new and useful Improvements in Systems for Collecting Railway Fares by Ticket, of which the following is a specification.

My invention relates to an improved method or system for collecting railway fares and tickets designed to carry this system into effect in the simplest and most satisfactory manner.

It is the object of my invention to provide means whereby the present practice of selling "scalpers' tickets" may be entirely defeated and railway fares collected in a manner which will not only simplify the present system, but will be of material advantage when tickets are sold over a number of different roads.

More particularly, it is the object of my invention to provide a ticket which will be issued by the agent upon the payment to him of a sufficient sum to cover the average baggage charges to the point of destination and which comprises a coupon filled in by said agent and indicating the amount to be paid by the purchaser to the conductor from whom he is to receive in return a cash-fare receipt and require a receipt on the back of the body of the ticket in blanks provided therefor. The amount collected by the agent is credited in full on the face of the ticket if it be a straight-trip ticket on the line of the company issuing it and if it be on several lines then on the first coupon covering the fare to be paid to the first destination on the road that issues the ticket. A separate coupon is provided for each of the several railroads over which the ticket is routed, and each conductor of the respective roads collects the full fare from the passenger and turns the same directly in to his company. In this manner the delay to which the intermediate roads are now subjected in collecting their proportion of the through fare paid for the ticket from the road issuing it is avoided, and each handles, through its conductor, its proportion of the full fare. In this manner no advantage can be gained by the passenger in selling a through-trip ticket at an intermediate point, nor at the same time is he subjected to the inconvenience and delay required to secure a refund on a partly-unused ticket.

My invention is particularly applicable to round-trip tickets and special-excursion tickets and provides the greatest safety to the purchaser and the least possible loss to the road. Thus, as will be seen in the drawings hereinafter referred to, the purchaser pays to the station agent from whom he secures the ticket the proper sum for its issuance, and this ticket carries coupons for going and returning over the several roads to and from its destination. Each of these coupons calls for the payment of full fare, and the benefit of the reduced sum for which the ticket is sold is to be derived only after the ticket has been used and returned to the agent from whom issued. To this effect the special contract provides for the rebate of a given sum upon return of the ticket, with cash-fare slips corresponding to the sums indicated on the several coupons, which will have been detached and for each of which the conductor collecting the sum thereon will have receipted for the same upon the back of the body of the ticket. This rebate will only be paid to the original purchaser upon proper identification, and it therefore follows that the return-trip ticket and coupons would not be available for scalpers' purposes, since a traveler would hardly be willing to pay any consideration for a ticket which required him to pay full fare on the train and to be identified by the agent who issued the ticket at its destination before receiving the rebate.

My system provides ample means to check the conductors and will enable railroads to sell tickets by which they can safely offer any reasonable reduction to passengers without fear of abuse, and at the same time the passenger has the advantage of paying for his ticket as he uses it.

Having thus set forth the objects and purposes of my invention, I will now make reference to the drawings, in which I have illustrated one form of ticket embodying the advantages of my system, and in which—

Figure 1 illustrates a front view of a four-coupon return-trip ticket which I have broken away at several points. Fig. 2 is a back view of the agent's stub. Fig. 3 is a back view of the body of the ticket with the receipt-forms for the sums to be collected on the coupons, as indicated on the stub in Fig. 2. Fig. 4 illustrates a cash-fare slip, which when properly punched serves as a receipt to the passenger and must be attached to the body of the ticket before any rebate can be had thereon.

The same reference-numerals refer to the same parts throughout.

The form of the ticket which I have chosen to illustrate my invention, but to which particular form I do not here limit myself, is a round-trip ticket in the usual form issued by railroads and comprising the agent's stub 1, the main body portion 2, and any desired number of coupons 3. The agent's stub on its front side is left blank, so that it can be filled out with any desirable subject-matter, and it therefore requires no special description here, and in the same way the front face of the body of the ticket comprises the usual numerals for the year, month, and day which are to be punched by the agent issuing the ticket to designate the date of its issue, and similar date-marks on the back indicate its limit. This body portion 2 also comprises a special contract numbered 10, which provides the terms upon the ticket which is sold and the manner in which it may be redeemed and the rebate secured if it be a round-trip ticket. If for the sake of illustration this ticket were filled out for a round-trip from Birmingham, Alabama, to New York, the sum of three dollars and fifteen cents would be inserted in the blank of this contract in which the sum paid the agent issuing it is to be inserted. This amount is intended to cover the baggage charges in case the party should use the ticket so received from the agent only for the purpose of forwarding his baggage to its destination. The sum so paid is to be deducted from the cash fare indicated on coupon No. 4, which would read as follows: "Issued by the Southern Railway Co. This coupon and $18.00 paid to conductor good from Birmingham, Ala., to Washington, D. C., upon conditions mentioned in contract. Worthless if detached." The full fare from Birmingham to Washington is twenty-one dollars and fifteen cents, as would appear on coupon No. 1, and from this amount on coupon No. 4 the three dollars and fifteen cents paid to the agent will be deducted. Return-coupon No. 1 would be good from Washington to Birmingham, and coupons Nos. 2 and 3 (not fully shown) would be issued on account of the Pennsylvania Railway Company and call for the payment each of six dollars and fifty cents, which is the straight fare between Washington and New York. This ticket will accordingly have four coupons, and upon the back of the stub there will be indicated in forms provided therefor the points to and from which these several coupons are good and the amounts to be paid thereon to the several conductors. In this manner the agent's stub when filled out fully indicates the several payments which are to be made by the purchaser in using the ticket and for which the several conductors will be accountable. Corresponding to this I provide upon the rear of the body of the ticket, as shown in Fig. 3, a series of receipt-forms, one for each coupon.

Each receipt-form has blanks which when properly filled out indicate the railway, the amount to be collected, as shown on the coupon therein numbered to which it relates, the points between which the coupon is good, and the signature of the conductor, with the train-number and date. According to the special contract the conductor is required to receipt for the sum collected by him when he takes up a coupon, and he accordingly signs his name and fills in train-number and date in the receipt-form relating to the coupon which he has detached. The rest of the receipt-forms will be filled out by the agent issuing the ticket. In addition to this receipt on the ticket itself the conductor may be required to issue the passenger a cash-fare receipt, (shown in Fig. 4,) so that the agent's stub, the body of the ticket, the coupon collected, and the cash-fare receipt all check the payment of fares and insure a safe system of collection for the railway company. In reality the ticket issued by the station agent is merely a passage-permit slip. The cash-fare receipt is to be retained by the passenger as evidence of his right to a passage between the points indicated thereon and in this manner is substantially the same as a straight ticket and cannot be used for stop-over purposes or transferred. The conductors each attach these cash-fare receipts to the body of the ticket, since they are required, as per the special contract, to enable the passenger to collect the rebate upon his return. The cash receipts may be in any desired form, that shown in Fig. 4 being merely for the purpose of illustration, and the terms and phraseology of the contract and receipts and coupons may all be varied in any manner to suit special occasion or the ideas of different companies without affecting the *modus operandi* of my system.

In connection with single-trip tickets over several roads the form will be substantially the same as that shown with the exception that there will be no rebate contract; but at the same time it will offer the advantages hereinbefore set forth with regard to enabling the passenger to stop off at transfer-points and enable the several roads to each collect their respective fares. By thus enabling the passenger to stop off at transfer-points the occasion which prompts the major part of the sale of tickets to scalpers will be avoided, since the passenger will lose nothing by destroying the ticket with the coupon upon which he could have continued his trip and upon which it would have been necessary for him to have paid full fare.

For local tickets to points on the road issuing them no coupons will be required, the main body of the ticket indicating the amount paid for its issuance and the amount to be paid to the conductor as fare, and this will be taken up and receipted in the usual manner and a cash-fare slip given the passenger.

The various forms of tickets to which my present system may be applied are too great in number for attempt at illustration or description. I have therefore chosen the round-trip form of ticket to illustrate the application of my system, but, as before stated, do not limit myself to the details of construction or anything more than the substance of the subject-matter embodied thereon.

Having thus described my invention, what I claim as new, and desire to secure by Letters Patent, is—

1. In combination with a round-trip-passage-permit slip suitably marked to indicate the nominal sum paid for its issuance and the rebate to be repaid upon its return, a plurality of coupons each suitably marked to indicate the points between which it is good and the sum to be collected in transit by the conductor detaching said coupon, a cash-fare-receipt slip suitably marked to indicate the sum so collected by each conductor and conductor's signature-blanks on the body of said passage-permit slip whereon each conductor signs a receipt for the sum collected by him.

2. In a railway-ticket, the combination with a stub, a body portion and coupons, of subject-matter suitably arranged upon said parts to indicate the points between which the ticket is good, the amount paid for the issuance of the ticket, the amount to be paid by the purchaser when each coupon is collected, and the amount, if any, to be refunded to the purchaser upon the surrender of said body portion and suitable evidence of payment by him of the proper sums to the party detaching the coupons.

3. In a railway-ticket, a body portion and coupons attached thereto, said body portion indicating the points between which the ticket is good and the consideration which has been paid for its issuance, said coupons indicating the points between which they are respectively good, the amounts to be collected by the conductor for passage between these points, said body portion being also appropriately designated to receive receipts from said conductors of the amounts collected by them.

4. The combination of a railway-ticket comprising a body portion and detachable coupons which parts are appropriately designated to indicate the points between which the ticket is good, the amount paid for the issuance of the ticket, the amounts to be paid upon the use of the ticket, with cash-receipt slips to be delivered to the purchaser upon the payment of said latter amounts.

5. In a round-trip railway-ticket, a body portion suitably designated to indicate the amount paid for the issuance of the ticket and the amount of the cash rebate upon its surrender, coupons designating the points between which they are good and the amounts to be collected upon the use of the ticket between said points when the coupons would be detached, said body portion being appropriately designated to receive receipts for the sums paid on said coupons.

6. In a round-trip ticket, the combination of a body portion and coupons, each of said coupons being suitably designated to indicate the points between which they are good and the amounts to be collected by the conductors when they detach said coupons, and said body portion being suitably designated to indicate the amount paid for the issuance of the ticket and provided with a receipt-form for each coupon and a signature-blank for conductors in each receipt.

7. In a round-trip railway-ticket, in combination with a stub suitably designated to indicate the points between which the ticket is good, the name of the purchaser and the sums to be collected between the several points for which separate coupons are provided and the railways over which said coupons are to be used, with a body portion suitably designated to indicate the amount paid for the issuance of the ticket and the rebate refunded to purchaser upon the return of the body portion and which is also provided with suitable forms which are designated to show receipts for the subsequent payment of cash fare by the purchaser, and a plurality of coupons each of which are suitably designated to indicate the points between which it is good, the route to be taken between said points and the amount to be collected by the conductor when the coupon is detached.

8. The herein-described improvement in railway-tickets comprising a ticket suitably designated to indicate the nominal sum paid for its issuance, the different sums to be collected by the conductors when it is used, and provided with a signature-blank whereon each conductor signs a receipt for the sum collected by him.

9. The herein-described means for carrying into effect a system for collecting railway fares comprising a ticket suitably designated to indicate the points between which it may be used, and the sums to be collected by the conductor or conductors at different times during the use of the ticket in transit, in combination with separate cash-fare-receipt slips to be furnished the passenger upon each payment of cash fare to a conductor.

10. The herein-described improvement in railway-tickets comprising a ticket suitably marked to indicate the nominal sum paid for its issuance, coupons suitably marked to indicate the points between which they are good, the road over which they are to be used and the sum to be paid as fare to the conductor detaching them, in combination with means for furnishing the passenger with receipts evidencing such payments in transit.

11. The herein-described means for carrying into effect an improved system for collecting railway fares comprising a passage-permit ticket issued by the station agent for a nominal consideration which is indicated thereon, said ticket being suitably designated to indicate its destination, the road or roads to be traveled over and the amounts to be paid to the conductor or conductors of each road while in transit over their line or lines.

12. The herein-described means for carrying into effect an improved system for collecting railway fares, comprising in combination an agent's stub, a ticket and one or more coupons, each coupon being suitably marked to indicate the amount to be collected in transit by the conductor who detaches it, and a cash-fare-receipt slip to be furnished by each conductor for the amount collected by him, said agent's stub being suitably marked to indicate the sum or sums to be collected on each coupon.

13. The herein-described means for carrying into effect an improved system for collecting railway fares comprising a passage-permit ticket for which a nominal sum is paid and which is suitably designated to indicate its destination, route, and the sum or sums to be collected in transit by the conductor or conductors to whom it is presented, said ticket being also suitably designated to provide a receipt-form by which each conductor receipts for the sum collected by him.

In testimony whereof I have signed my name to this specification in the presence of two subscribing witnesses.

ROBERT F. CARR.

Witnesses:
  H. M. HORTON,
  R. D. JOHNSTON.